(12) United States Patent
Curran

(10) Patent No.: US 7,175,783 B2
(45) Date of Patent: Feb. 13, 2007

(54) CARBON ELECTRODE FOR USE IN AQUEOUS ELECTROCHEMICAL DEVICES AND METHOD OF PREPARATION

(76) Inventor: Patrick Michael Curran, 3167 Sunnyslope Blvd., Pasadena, CA (US) 91107

(*) Notice: Subject to any disclaimer, the term of this patent is extended or adjusted under 35 U.S.C. 154(b) by 364 days.

(21) Appl. No.: 10/921,673

(22) Filed: Aug. 18, 2004

(65) Prior Publication Data
US 2005/0042513 A1  Feb. 24, 2005

Related U.S. Application Data

(60) Provisional application No. 60/496,341, filed on Aug. 19, 2003.

(51) Int. Cl.
  *H01B 1/24* (2006.01)
  *B32B 33/00* (2006.01)
(52) U.S. Cl. ........................ 252/511; 428/221
(58) Field of Classification Search ............... 252/511; 428/221
  See application file for complete search history.

(56) References Cited

U.S. PATENT DOCUMENTS

| | | | | |
|---|---|---|---|---|
| 3,281,511 A | * | 10/1966 | Goldsmith | .................. 264/49 |
| 3,890,417 A | * | 6/1975 | Vallance | ...................... 264/49 |
| 4,153,661 A | * | 5/1979 | Ree et al. | .................... 264/120 |
| 4,320,185 A | * | 3/1982 | Bernstein et al. | ........... 429/217 |
| 4,379,772 A | * | 4/1983 | Solomon et al. | .............. 264/49 |
| 4,556,618 A | * | 12/1985 | Shia | .......................... 429/217 |
| 4,862,328 A | * | 8/1989 | Morimoto et al. | .......... 361/502 |
| 6,072,692 A | * | 6/2000 | Hiratsuka et al. | ........... 361/502 |
| 6,127,474 A | * | 10/2000 | Andelman | .................. 524/495 |
| 2004/0170821 A1 | * | 9/2004 | Iwaida et al. | ............... 428/323 |

* cited by examiner

*Primary Examiner*—Mark Kopec
(74) *Attorney, Agent, or Firm*—Christie, Parker & Hale, LLP

(57) ABSTRACT

A high tensile strength, highly conductive flexible composite sheet consisting of fibrillated PTFE polymers, performance enhancing dopants, and carbon particles useful in electrochemical devices such as flow through capacitors, capacitive deionization, electronic water purification, fuel cells, capacitors, super-capacitors and a method of preparation. The method consists of mixing the materials and calendering to the desired thickness and strength all at room temperature and leaving the material in a wet state without further drying.

6 Claims, No Drawings

CARBON ELECTRODE FOR USE IN AQUEOUS ELECTROCHEMICAL DEVICES AND METHOD OF PREPARATION

CROSS-REFERENCE TO RELATED APPLICATIONS

This application claims the benefit of provisional patent application Ser. No. 60/496,341 filed Aug. 19, 2003 by the present inventors.

FEDERALLY SPONSORED RESEARCH

Not applicable

SEQUENCE LISTING OR PROGRAM

Not applicable

BACKGROUND OF INVENTION

1. Field of the Invention

This invention relates to carbon electrodes made with fibrillated polytetrafluoroethylene (PTFE) for electrochemical devices and their methods of preparation.

2. Prior Art

The process of fibrillating PTFE has been known for some time and has been included in many patents that will be discussed later. During fibrillation, other ingredients are added that provide various aspects of functionality such as carbon for electrical capacitance and chemical adsorption.

The typical process to produce fibrillated PTFE with carbon is to mix PTFE, carbon, and solvents under high shear and high temperature, biaxially calendar the material at high temperature, extrude into the final form at high temperature, and dry the product at high temperature to remove the solvents. It is clear that high temperature was considered a critical part of the process of creating PTFE carbon electrodes in the prior art and that the final product must be dried prior to use in devices. Any solvents that are critical to the operation of the device must be added in a subsequent operation.

It is clear from the prior art for producing carbon containing electrodes made with PTFE that the first step must be a high shear mixing step. Ree et al. (U.S. Pat. No. 4,153,661), in describing production of carbon filled PFTE webs, specifies to mix materials together and then high shear mixed between 50–100 C. prior to biaxial calendering. Solomon (U.S. Pat. No. 4,379,772) shows that materials are to be mixed without solvents, and then high shear mixed to cause fibrillation. Shia (U.S. Pat. No. 4,556,618), describes the importance of initial high shear mixing on the final properties of the carbon electrode. Finally Andelman (U.S. Pat. No. 6,127,474), while describing the manufacture of carbon electrodes for a flow through capacitor, specifically states that the ingredients are typically mixed under high heat and high pressure conditions.

The next step in the process is the biaxial calendering of the mixed material to produce a fibrillated sheet. A consistent theme in the prior art is the insistence of high temperature during this process. Ree et al. (U.S. Pat. No. 4,153,661) teaches that this step should be done from 50–100 C. Solomon (U.S. Pat. No. 4,379,772) recommends a target calendering temperature of 50 C. Andelman (U.S. Pat. No. 6,127,474) recommends 320 F. as a target temperature. The purpose of the biaxial calendering step is to fibrillate the material and produce a flexible sheet. Fibrillation occurs when the material is subjected to high shear, which causes the microscopic particles of PTFE contained in the mixture to unravel. These particles unravel similar to a ball of yarn that has many strings wrapped around it. As the many pieces of string of the many particles unravel, they begin to intertwine with each other, creating the microscopic web that holds together all of the particles and provides the sheet with tensile strength and dimensional stability. The shear rate of an operation is significantly affected by the temperature of the material being sheared. As the temperature rises, the viscosity of the material drops and the shear rate drops. By biaxially calendering material at higher temperatures, the time and effort to produce an equivalently fibrillated sheet is much longer. Also, running this operation at higher temperatures, especially those approaching the boiling point of water, causes the material to lose water quickly. As water is lost, the viscosity of the material rises in an uncontrolled manner, the rate of fibrillation increases quickly, and makes it very difficult to fibrillate to a consistent level.

The drying step is universally recommended in all prior art references. When carbon PTFE material is dried, water that had been incorporated into the very small pores within and around the carbon particles is remove as vapor. When the material is rewet, some of these originally wet internal pores do not rewet. Since these devices work on the principal of ion adsorption onto surfaces of carbon particles, the less surface available to the ion, the less adsorption. When the adsorption of water is reduced, the overall capacitance of the device is reduced. Also, the electrical resistance of the device increases. This is due to the lack of open pathways for the ions to electrochemically diffuse into and out of the carbon electrodes. When this electrochemical diffusion resistance is higher, the speed at which the device can operate is reduced, thereby reducing the ion removing power. In summary, drying the material reduces the capacity of the device by 10 to 15%.

Vallance (U.S. Pat. No. 3,890,417), Goldsmith (U.S. Pat. No. 3,281,511), Ree et al. (U.S. Pat. No. 4,153,661), Bernstein (U.S. Pat. No. 4,320,185), Solomon (U.S. Pat. No. 4,379,772), Shia (U.S. Pat. No. 4,556,618), Morimoto (U.S. Pat. No. 4,862,328), Hiraksutka (U.S. Pat. No. 6,072,692), and Andelman (U.S. Pat. No. 6,127,474) all describe the importance of drying carbon electrode material. There are some applications where it is important to eliminate any traces of water due to the design of the device and others where the PTFE or other binder/component must undergo sintering at high temperature. In descriptions for electrode material clearly destined for aqueous electrochemical devices, drying is a described as a key step. Ree et al. (U.S. Pat. No. 4,153,661) recommends drying at 20–100 C. for anywhere from 1 to 100 hours. Andelman (U.S. Pat. No. 6,127,474), describing the process to produce carbon electrodes for use in aqueous electrochemical devices, states as examples either formulations that do not have any water, or small amounts that then are subjected to extremely high temperatures. In any case, the resultant carbon electrodes produced by the Andelman (U.S. Pat. No. 6,127,474) patent are dry.

Not only do dried electrodes never regain their original ionic capacity, they also take an extremely long time to rewet. Studies have shown that it takes anywhere from a few days to a few weeks for a dried electrode to come to equilibrium. This equilibrium level is not equivalent to the original absorption capacity as mentioned above.

It is critical to prevent active surface area from drying due to the electrode's inability to rewet and hence loss performance. In order for the wetted surfaces to function in a device, ions must be originally present in the water that fills the porosity. If this water does not contain a sufficient amount of ions or conductivity, upon assembly, the ionic capacity of the device is reduced and can never recover. The reason that ions can not diffuse into these deionized areas after assembly is due to the fact that the carbon electrode is sandwiched in between a solid current collector and an ion specific membrane in most aqueous electrochemical devices. This arrangement prevents any further ion pairs from diffusing into the electrode, hence reducing the ionic capacity of the electrode and device.

BACKGROUND OF THE INVENTION—OBJECTS AND ADVANTAGES

Accordingly, several objects and advantages of our invention are:
 a) the elimination of performing any of the process steps at temperatures above room temperature;
 b) the elimination of the high shear mixing step;
 c) incorporation of performance enhancing dopants;
 d) the complete elimination of the final drying step; and
 e) how these advantages drastically improve the overall final performance of the device.

In this invention, we have shown that mixing should be done at room temperature and via distributive mixing versus shear mixing. Distributive mixing slowly moves small portions of the material from one spot in the mixer to another. After this happens thousands of times, the batch appears homogeneous on a microscopic level. This greatly simplifies this first operation by shortening the cycle time, reducing the capital cost of equipment since only a pastry mixer is necessary, and reduces the process variability. When a high shear process is utilized, it is very critical that the degree of shear is accurately controlled or the product properties will vary significantly. The level of shear imparted to the material is extremely sensitive mixing speed, blade clearances, temperature, and water content. If any of these parameters vary slightly, the product quality will change significantly. The ability to eliminate the high shear mixing step is provides a drastic improvement for process control and simplicity.

The next process step is biaxial calendering which performs the fibrillation process. Conducting this process at room temperature also creates an easier, faster, and more consistent process by reducing the time, eliminating heaters and temperature controllers, and better controlling the viscosity of the material. By running at room temperature, the evaporation rate of water from the material being fibrillated is very low, which allows for tight control of the final fibrillation level.

Testing has shown that process described in this patent produces material with tensile strength in the range of 0.7 MPa (0.07 kg/mm), more than sufficient for use in automated equipment and device assembly. Morimoto states desired values of at least 0.02 kg/mm (0.2 MPa) for carbon electrodes use in capacitors. Andelman states that the tensile strength of acceptable material for use in a flow through capacitor should be greater than 0.05 kg/mm2.

The last step of drying the material is skipped in this invention. By skipping the drying step, not only is the process simplified and greatly shortened from weeks to hours, the product quality for use in an aqueous electrochemical device such as a flow through capacitor, electronic water purifier, capacitive deionization device, or other aqueous based capacitors is greatly improved. The equivalent series resistance (ESR) of an electronic water purifier cell made with non-dried electrodes is 25% less than one made with previously dried electrodes (from approximately 0.25 to 0.19). This translates into a 10–15% increase in average purification, or from an average of 60% to 68%. This allows for 10–15% less equipment or cells to be used to accomplish the same purification and flow rate.

This invention proposes the incorporation of a dopant such as salt into the initial formulation in levels equal to or greater than the operating concentrations of the device. The dopant chosen should be appropriate to the device and application. In the case of water purification, the dopant can be sodium chloride, potassium chloride, or other appropriate alkali metal halides. By incorporating the salt into the initial formula and skipping the drying step, wetted internal porosity contains ions that will contribute to the capacity of the device. The addition of salt into the formulation decreases the electrical resistance by another 25% (from approximately 0.18 to 0.13) and increases the average purification by another 10–15% from 68% to 75%.

The overall effect of skipping the drying step and incorporating salts into the formulation is 50% reduction in ESR and 25% increase in overall percent purification. The reduction in ESR also translates into an equivalent reduction in electrical consumption which is a very important attribute for customers installing water purification equipment in remote locations.

In summary, these novel and unobvious inventions greatly simplify and improve the preparation methods and performance of aqueous electrochemical devices by reducing the complexity of the equipment, reducing process variability, reducing cycle time, and reducing the electrical resistance of the material which improves the capacity of the device.

Further objects and advantages of our invention will become apparent from a consideration of the drawings and ensuing description.

SUMMARY

The high tensile strength highly conductive flexible composite sheet material for use as an electrode in an electrochemical device comprises: a. approximately 80% by dry weight of an activated carbon, b. approximately 10% by dry weight of a carbon black, c. approximately 1% by dry weight of a performance enhancing salt dopant, and d. approximately 9% by dry weight of fibrillated polytetrafluoroethylene. The activated carbon has a surface area of at least 1,000 square meters per gram and an average particle size no greater than 20 microns. The carbon black has a surface area of at least 1,000 square meters per gram. The dopant is chosen from the group of alkali metal halides, and the total weight of the finished electrode will be on the order of 1 to 4 times greater than the dry weight.

The method consists of mixing PTFE, various types of carbon, salts, and water together under distributive mixing conditions at room temperature and fibrillating the material by biaxial calendering at room temperature to the desired strength and thickness levels. The material is left in a wet condition so as to enhance the electrochemical properties.

DRAWINGS

No drawings.

DETAILED DESCRIPTION OF THE INVENTION

The PTFE sheet material of the invention is prepared by mixing PTFE dispersion, carbon black, activated carbon, water, and a salt together in a mixer. The mixer can be a single planetary mixer with one blade, a double planetary mixer with two blades, or any other type of mixer that can distributively mix the materials without any significant amounts of shearing. The key aspect of this step is to distribute the ingredients as much as possible without shearing the material or increasing evaporation rate of water. The batch size can be from 1 pint up to hundreds of gallons of volume of material.

Once the composition of carbon, water, salt, and PTFE is adequately dispersed, it is removed from the mixing container and biaxially calendered to the desired thickness and fibrillation level. The calendar is a set of two large rollers spinning in opposite directions with a small gap in between the rollers called a nip. The material is placed at the nip on the side which will allow the material to be pulled into the nip by the rollers. The material is removed, folded, reinserted into the nip. This is repeated until the sheet material has fibrillated sufficiently.

EXAMPLE 1

1. The product is mixed at 10–60 rpm depending on the size of the mixer in a single or double planetary mixer with ceramic coated or stainless steel blades. Mixers that provide acceptable distributive mixer are Hobart and Kitchen Aid. The mixing container is usually made from stainless steel or coated carbon steel. The preferred formulation is Activated Carbon (Nuchar RGC, average particle size of 15 microns, surface area of 1800 m2/gm) 4,690 grams, Carbon Black (Black Pearls 2000, surface area of 1,500 m2/gm) 469 grams, Teflon T-30 dispersion 969 grams (60% solids), DI water 13,192 grams, and the alkali metal halide sodium chloride 68 grams. All of the carbon black, T-30, salt, and water are added to the mixer and mixed at room temperature and low speed for 15 minutes. Then 1,100 grams of the activated carbon is added and mixed for 5 minutes. The activated carbon is added in this size increment until complete. Then the batch is mixed for the last time for 10 minutes and removed from the mixer. At this point, the water content of the resultant material is approximately 68%, or the ratio of water to dry components is approximately 2 to 1.

2. The mixed batch is then run through a calendar such as an Acme Roll Sheeter. The nip on the rollers is set to 0.030" and speed set at approximately 200 rpm. A portion of the material, typically 300 grams is put through the nip and received on the return conveyor. The material is recovered, rotated 90 degrees, folded in half, and reinserted into the nip of the calender. This process is repeated until the material has passed through the nip 10–20 times. Room temperature is acceptable for the process and calender rollers. By the end of this process, the material thickness should be in the 0.040"–0.125" range and is ready to be sheeted. A typical thickness is 0.050"

3. The product from the calendar is trimmed to the desired width. The roller speed is reduced to 30–90 rpm with a typical speed of 45 rpm. The nip size is set to 0.005" so as to produce a product in the 0.008"–0.012" range. The material is feed one last time through the nip to achieve the desired sheet thickness. As the material exits the calender, it is placed into a sealable container, a container with soak solution, or assembled directly into the electrochemical device. This operation can also be done with a second calender already set to the correct speed and nip size thereby streamlining the production of the electrode.

EXAMPLE 2

The same procedure is followed as in example one. The activated carbon is substituted with Maxsorb Activated Carbon from the Kansai Coke product.

EXAMPLE 3

The same procedure is followed as in example one. The ratio of activated carbon and carbon black to dry Teflon is reduced from 9:1 to 8:2.

EXAMPLE 4

The same procedure is followed as in example one. The dopant sodium chloride is substituted with another alkali metal halide potassium iodide.

EXAMPLE 5

The same procedure is followed as in example one. The Teflon T-30 dispersion is substitute in part or whole with dry Teflon 601 A.

The invention claimed is:

1. A high tensile strength highly conductive flexible composite sheet material for use as an electrode in an electrochemical device, comprising:
    a. approximately 80% by dry weight of an activated carbon,
    b. approximately 10% by dry weight of a carbon black,
    c. approximately 1% by dry weight of a performance enhancing salt dopant, and
    d. approximately 9% by dry weight of fibrillated polytetrafluoroethylene.

2. The composition of claim 1 where said activated carbon has a surface area of at least 1,000 square meters per gram.

3. The composition of claim 1 wherein said activated carbon has an average particle size no greater than 20 microns.

4. The composition of claim 1 wherein said carbon black has a surface area of at least 1,000 square meters per gram.

5. The composition of claim 1 wherein said dopant is chosen from the group of alkali metal halides.

6. The composition of claim 1 wherein the total weight of the finished electrode will be on the order of 1 to 4 times greater than the dry weight.

* * * * *